Dec. 23, 1930.   C. B. KURTZ   1,786,400
VEHICLE LIGHT
Original Filed Feb. 21, 1928   3 Sheets-Sheet 1

INVENTOR.
Cyrus B. Kurtz
BY
Fay, Oberlin + Fay
ATTORNEYS

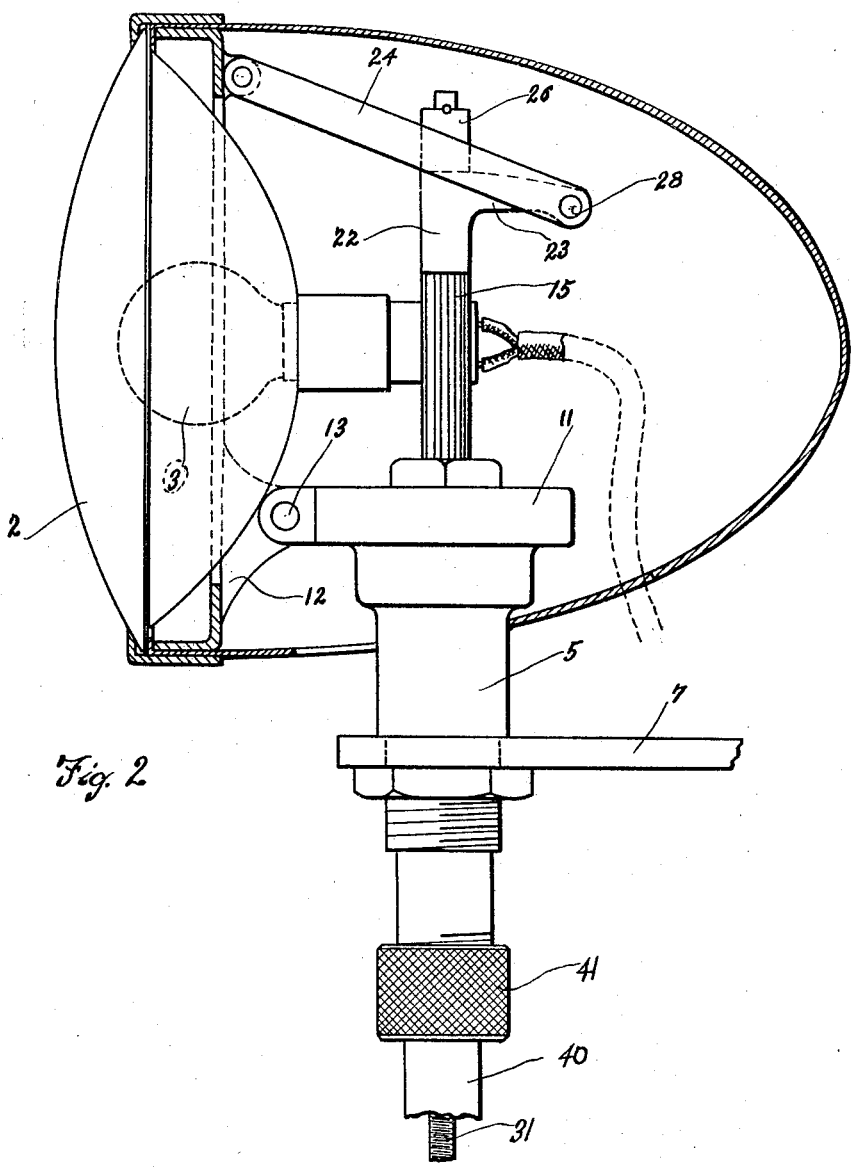

Dec. 23, 1930.  C. B. KURTZ  1,786,400
VEHICLE LIGHT
Original Filed Feb. 21, 1927   3 Sheets-Sheet 3

INVENTOR.
Cyrus B. Kurtz
BY
Fay, Oberlin & Fay
ATTORNEYS

Patented Dec. 23, 1930

1,786,400

UNITED STATES PATENT OFFICE

CYRUS B. KURTZ, OF LAKEWOOD, OHIO, ASSIGNOR TO THE NATIONAL APPLIANCE COMPANY, OF CLEVELAND, OHIO, A CORPORATION OF OHIO

VEHICLE LIGHT

Application filed February 21, 1928, Serial No. 255,913. Renewed October 27, 1930.

The present invention, relating as indicated to vehicle lights is particularly directed to an improved light for use both on motor vehicles and for other purposes which shall be capable of movement in two planes and may be conveniently and readily controlled from a remote point, as for instance, in the case of a motor vehicle, from the driver's seat.

The principal object of the invention is the provision of a simple and economical light, together with the simple control means, which shall be convenient in operation and which shall maintain the light in any desired position in which it has been placed.

To the accomplishment of the foregoing and related ends, said invention, then, consists of the means hereinafter fully described and particularly pointed out in the claims; the annexed drawing and the following description setting forth in detail certain mechanism embodying the invention, such disclosed means constituting, however, but one of various mechanical forms in which the principle of the invention may be used.

Figure 1:
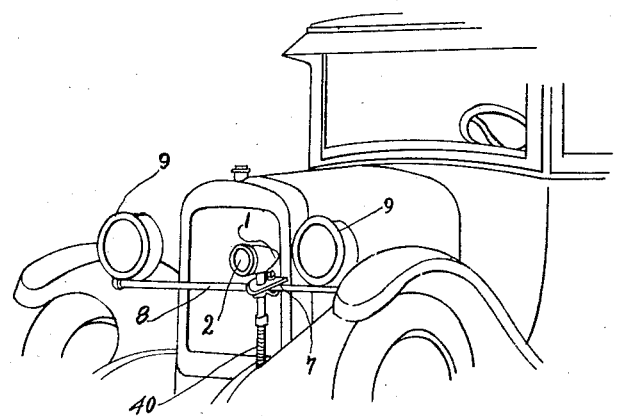
Figure 4:
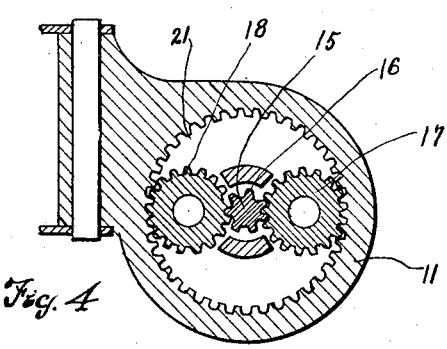
Figure 7:
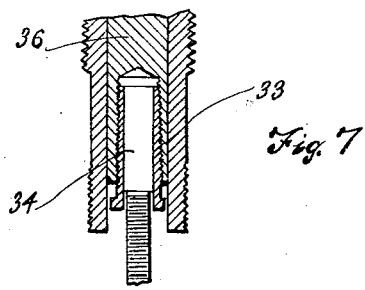
Figure 6:
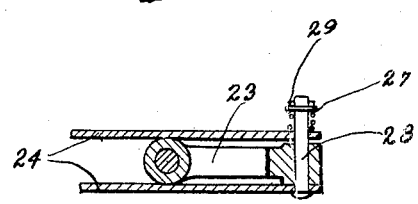
Figure 5:
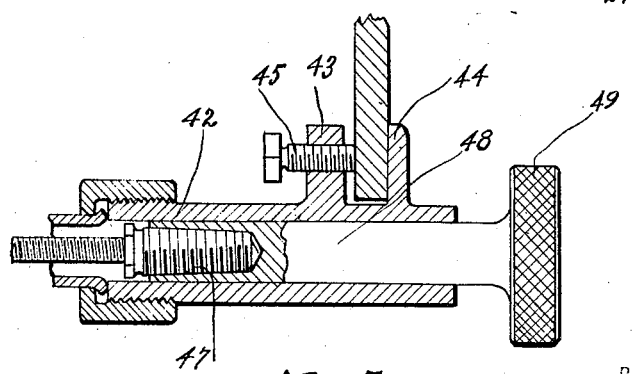
Figure 3:
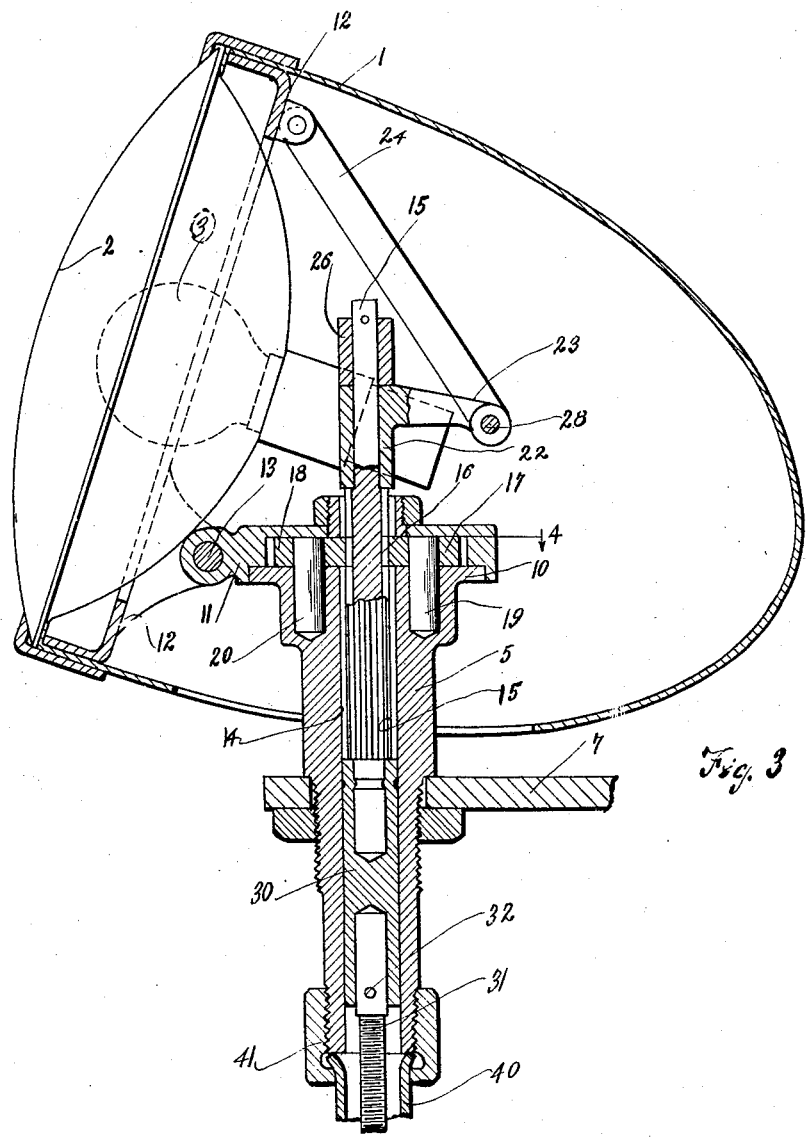

In said annexed drawings:

Fig. 1 is a view in perspective of the forward end of a motor vehicle on which my improved light is mounted; Fig. 2 is a side elevation partially in section of the light and mounting therefor when the light is in the normal or horizontal position; Fig. 3 is a central longitudinal section through my improved light and mounting showing the light in a tilted position; Fig. 4 is a section on the line 4—4, Fig. 3; Fig. 5 is a transverse section showing the operating mechanism for moving the light; Fig. 6 is a plan view of a detail of construction; and Fig. 7 is a longitudinal section showing the engagement between the end of a flexible cable and a shaft carried in the base or mounting of a lamp.

Referring to Figs. 1, 2 and 3 there is shown a lamp casing 1 of conventional form, in which is removably mounted a lens or glass 2, an electric bulb 3, on which the electrical connections may be carried in any suitable manner. The lamp casing is movably mounted upon a supporting member 5 from which there extends a transverse bracket 7 adapted to clamp about the usual cross-rod 8 extending between the main lamps 9 of a motor vehicle as shown in Fig. 1. The removable light is thus mounted between the main lights at about the same elevation and in front of one side of a radiator shell.

This disposition of the light in front of the radiator and on the bracing rod between the main lamps presents several advantages in that the driver does not have to look through the rays of the lamp, as is the case where the lamp is mounted either on the windshield or on one of the supports or pillars of the body, and also in the fact that the lamp is at such an elevation that it does not throw its rays into the eyes of drivers in oncoming cars. Furthermore, in this position the lamp is not an obstruction to the view of the road of the driver, as is the case where a bulky lamp is mounted alongside one of the corner pillars of the body.

The construction of the lamp and mounting is best shown in Fig. 3. The support 5, which is secured to the cross-rod and extends vertically upward, terminates in a single plate 10, upon which is rotatably mounted a second plate 11, to the forward portion of which is pivotally secured the frame 12 of the lamp casing about a horizontal axis in the form of a pin or shaft 13. This mounting for the lamp casing allows for movement in a vertical plane from a position below the horizontal to one above the horizontal, as shown in Fig. 3. Extending through a central opening 14 in the housing 5 is a shaft 15, a considerable length of which is formed with gear teeth 16, which engage with small pinions 17 and 18 which are rotatably mounted on pins 19 and 20, respectively carried in suitable sockets in the enlarged upper end of the housing 5. These pinions 17 and 18 are in turn engaged with an internal gear 21 formed integrally with the supporting plate 11 for the lamp casing so that rotation of the shaft 15 will cause rotation of the fixed gears 17 and 18 and a corresponding rotation of the plate 11 and lamp casing 1 about the vertical axis.

The movement of the lamp about the horizontal axis 13 is effected by sliding the shaft 15 in the support 5. At its upper end the shaft 15 carries a collar 22 having an extending arm 23, to the outer end of which are pivotally secured arms 24, which extend to the frame 12 of the lamp adjacent to the top of the same. These arms 24 fit snugly over a friction sleeve 26 which is carried on the upper end of the shaft 15. The engagement between the arms 24 and the friction sleeve 26 continues throughout practically the entire range of movement of the lamp in a vertical plane. The arms 24 are under spring pressure and thus frictionally grip the sleeve, this engagement serving as a brake to prevent up and down, and also rotary, movement of the lamp, that is, any pivoting action caused by road vibration, and maintaining the lamp in whatever tilted position it may be brought. The said pressure is effected by means of a coil spring 27 disposed about a pin 28, which serves as the axis between the arm 23 and the arm 24 and engaging between one of these arms and the washer 29 fixed to the extending outer end of the pin.

Vibration of the lamp about its vertical axis, and also up and down movement, which might be caused by road vibration or movement of the car, is prevented by the frictional engagement and drag through the gear train, consisting of the gear rod 15, pinions 17 and 18, and the internal gear 21, and also by a snug fit between an intermediate shaft section 30, and the housing 5, said intermediate section being secured to the lower end of the shaft 15 and then to the upper end of the flexible shaft or cable 31. This section 30 has a smooth but snug fit within the lower portion of the opening in the support 5 and the resistance to movement of this shaft, and also the resistance through the gear train, serves to maintain the lamp in any desired angular or vertical position about the axis of the shaft 15.

In Fig. 3 I have shown a flexible shaft 31 secured to the shaft section 30 by means of a pin 32, but another alternative construction is shown in Fig. 7, in which a split sleeve is tapered externally and is threaded and engages in complementary tapered threading formed in the lower end of the intermediate shaft section 36, which corresponds to the shaft section 30 of Fig. 3. By screwing in the split sleeve it is forced to contract and securely grip the upper end of the flexible shaft.

The flexible shaft or cable 31 is carried in a flexible casing 40, the end of which is clamped against the lower end of the support 5 by means of a nut 41, while the other end of the casing is similarly clamped to the end of a support or sleeve 42, which is provided with spaced arms 43 and 44 adapting it to fit over the lower edge of the cowl or instrument board of vehicle, where it may be clamped in place by means of a set screw 45.

It will be understood that where the lamp is manufactured as a part of the vehicle, instead of being added as an attachment, other means for mounting the inner end of the flexible shaft and casing may of course be employed.

The shaft 31 extends through the casing 40 and terminates in a tapered threaded end 47, which may be screwed into a corresponding recess in an operating handle 48 which terminates in a knurled disc 49. The handle 48 is rotatably and slidably mounted in the support 42.

The operation of the lamp may be effected through the handle 49. When the handle 49 is moved inwardly the shaft 15 is moved vertically upward, causing the arm 23 to act on the arm 24 to cause the upper portion of the casing 1 to move forwardly about the horizontal axis 13. Such action of course tilts the beams from the lamp downwardly. Retraction of the handle 49 tilts the rays from the lamp upwardly. In the meantime the engagement between the gear teeth 16 and the pinions 17 and 18 is not disturbed as the teeth on the shaft 15 extend throughout a considerable distance adjacent to the upper end of the shaft. Thus, after the lamp has been tilted vertically to the desired angle it may be rotated by then turning the handle 49, thus rotating the flexible shaft, the section 30, the shaft 15 and the pinions 17 and 18, which in turn rotate the lamp mounting or plate 11 about the axis of the shaft 15. The handle 49 is disposed in a convenient position to the operator and it may be extended as far as is desired toward the driving seat from the instrument board to bring it into the most convenient position.

The present lamp is simple in construction and economical to manufacture, while all of the operating parts are fully enclosed within the lamp casing 1 and are of such construction and interengagement that they effectively prevent chattering of the lamp, either in a vertical or horizontal plane. The flexible shaft employed for operating the lamp may be carried either beneath the radiator, through an appropriate opening in the radiator or through the fender skirt, and then back alongside of the frame and fender and then upwardly through the hood to be brought through the dash board into the driver's compartment for connection to the operating support, as shown in Fig. 5. It will be apparent that other dispositions may be made of the lamp aside from the mounting on the rod between the main headlights, as the employment of the flexible shaft permits control of the light regardless of its particular position on the vehicle, and it may equally well be mounted on the side of the radiator or on one of the pillars or top of the body, although such a mounting will sacrifice, as already explained, certain of the advantages of the present arrangement.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:

1. A movable lamp for vehicles or the like comprising a tubular support adapted to be attached to a portion of a vehicle, a lamp attached to said support by a pivot, a rod reciprocable in said support, an arm projecting from said rod, a friction sleeve on said rod above said arm, a pair of links attached to said arm and to said lamp at a point above said pivot and straddling said friction sleeve, and resilient means pressing at least one of said links toward said sleeve.

2. A movable lamp for vehicles or the like comprising a tubular support adapted to be attached to a portion of a vehicle, a lamp attached to said support by a pivot, a rod reciprocable in said support and projecting therefrom, a collar on the projecting end of said rod beyond said support, an arm extending laterally from said collar, a friction sleeve on said rod beyond said collar, a pair of links attached to said arm and to said lamp at a point beyond said pivot and straddling said friction sleeve, and resilient means pressing at least one of said links toward said sleeve.

3. A movable lamp for vehicles or the like comprising a tubular support adapted to be attached to a portion of a vehicle, a lamp attached to said support by a pivot, a rod reciprocable in said support, an arm projecting from said rod, a friction sleeve on said rod above said arm, a pair of links attached to said arm and to said lamp at a point above said pivot and straddling said friction sleeve, resilient means pressing at least one of said links toward said friction sleeve, an operating handle at a point remote from said lamp, and means connecting said handle and said rod.

4. A movable lamp for vehicles or the like comprising a tubular support adapted to be tached to a portion of a vehicle, a rod rotatably mounted in said support, gear teeth on said rod, a pinion rotatably mounted on said support in mesh with the teeth of said rod, a plate mounted on said support and carrying teeth in mesh with said pinion, a lamp carried by said plate, and means for rotating said rod.

5. A movable lamp for vehicles or the like comprising a tubular support adapted to be attached to a portion of a vehicle, a rod rotatably mounted in said support, gear teeth on said rod, a pinion rotatably mounted on said support in mesh with the teeth of said rod, a plate mounted on said support and carrying teeth in mesh with said pinion, a lamp carried by said plate, a sleeve in said support non-rotatably connected to said rod and having close frictional contact with said support, and means for rotating said sleeve.

6. A movable lamp for vehicles or the like comprising a tubular support adapted to be attached to a portion of a vehicle, a rod rotatably mounted in said support, gear teeth on said rod, a pinion rotatably mounted on said support in mesh with the teeth of said rod, a plate mounted on said support and carrying teeth in mesh with said pinion, a lamp carried by said plate, a sleeve in said support non-rotatably connected to said rod, an operating handle mounted at a point remote from said sleeve, and a flexible cable connecting said sleeve and said handle.

7. A movable lamp for vehicles or the like comprising a tubular support adapted to be attached to a portion of a vehicle, a rod reciprocably and rotatably mounted in said support, longitudinally extending teeth forming the major portion of the surface of said rod, a rotatable plate mounted on said support and sleeved over said rod, a lamp attached to said plate by a pivot, means connecting said rod with said lamp and toothed means connecting said rod with said plate.

8. A movable lamp for vehicles or the like comprising a tubular support adapted to be attached to a portion of a vehicle, a rod reciprocably and rotatably mounted in said support, a rotatable plate mounted on said support and sleeved over said rod, a lamp attached to said plate by a pivot, a link connected to said rod and to said lamp at a point spaced from said pivot. and means connecting said rod and said plate.

9. A movable lamp for vehicles or the like comprising a tubular support adapted to be attached to a portion of a vehicle, a rod reciprocably and rotatably mounted in said support, longitudinally extending teeth forming the major portion of the surface of said rod, a rotatable plate mounted on said support and sleeved over said rod, a lamp attached to said plate by a pivot, a link connected to said rod and to said lamp at a point spaced from said pivot. a pinion carried by said support in mesh with the teeth on said rod, an internal gear on said plate and meshing with said pinion, and single means for reciprocating and for rotating said rod.

10. A movable lamp for vehicles or the like comprising a lamp body, a tubular support within said lamp body, a pivot plate rotatbaly mounted on said tubular support, a pinion shaft rotatably and slidably mounted within said tubular support, and gear and link means connecting said pinion shaft to said lamp body.

11. A movable lamp for vehicles or the like comprising a symmetrical lamp body having a central substantially horizontal axis, a tubular support projecting into said lamp body, the axis of said support being disposed to one side of said axis of said body, a sliding and rotating shaft mounted within said tubular support, and connecting means interposed between said lamp body and said shaft and adapted to transmit movement of said shaft to said lamp body.

Signed by me, this 17th day of February, 1928.

CYRUS B. KURTZ.